United States Patent [19]

Norman et al.

[11] Patent Number: 5,433,964
[45] Date of Patent: Jul. 18, 1995

[54] PROCESS OF COATING STRANDULA FOOD

[75] Inventors: Carl M. Norman, Syracuse; Carleton G. Merritt, Phoenix, both of N.Y.

[73] Assignee: Borden, Inc., Columbus, Ohio

[21] Appl. No.: 89,246

[22] Filed: Jul. 9, 1993

Related U.S. Application Data

[60] Continuation-in-part of Ser. No. 991,454, Dec. 15, 1992, abandoned, which is a division of Ser. No. 745,055, Aug. 6, 1991, abandoned.

[51] Int. Cl.⁶ .......................... A23B 9/00; B65B 55/00
[52] U.S. Cl. ..................... 426/303; 426/307; 426/324; 426/557
[58] Field of Search ............... 426/302, 303, 307, 324, 426/325, 557

[56] References Cited

U.S. PATENT DOCUMENTS

| | | |
|---|---|---|
| 2,451,096 | 10/1948 | Kodman . |
| 3,454,406 | 7/1969 | Alderton . |
| 3,840,685 | 10/1974 | Lyall et al. . |
| 4,177,753 | 12/1979 | Bougeois ................. 118/16 |
| 4,245,580 | 1/1981 | Okawara et al. ........... 118/19 |
| 4,552,772 | 11/1985 | Saitoh et al. ............. 426/557 |
| 4,597,976 | 7/1986 | Doster et al. ............. 426/325 |
| 4,599,238 | 7/1986 | Saitoh et al. ............. 426/557 |
| 4,640,218 | 2/1987 | Motoyama et al. ......... 118/19 |
| 4,659,576 | 4/1987 | Dahle et al. .............. 426/324 |
| 4,734,291 | 3/1988 | Raffens et al. ............ 426/325 |
| 4,769,247 | 9/1988 | Rothenberg .............. 426/291 |
| 5,057,330 | 10/1991 | Lee et al. ................ 426/120 |
| 5,100,683 | 3/1992 | Singer et al. ............. 426/302 |

FOREIGN PATENT DOCUMENTS

| | | |
|---|---|---|
| 0322996 | 7/1987 | European Pat. Off. . |
| 0415787 | 3/1991 | European Pat. Off. . |
| 2130906 | 11/1972 | France . |
| 64-74958 | 3/1989 | Japan ................. 426/302 |
| 1500335 | 2/1978 | United Kingdom . |
| 0848029 | 5/1979 | U.S.S.R. . |
| 03169 | 3/1991 | WIPO . |

Primary Examiner—Leo B. Tentoni
Attorney, Agent, or Firm—Stevens, Davis, Miller & Mosher

[57] ABSTRACT

A double walled drum of concentric cylinders having end seals and insulation between the cylinders. The drum is open at both ends and rotates on its center longitudinal axis which is pitched from the horizontal with the entrance on the high side. Diameter restrictions at the entrance and discharge ends of the drum increase product residence time. Lifters at the entrance end discharge end push flexible strandular food subject to microbial spoilage such as strands of cooked pasta away from the entrance and out the discharge. Pins are mounted perpendicular to the inner cylinder wall and point to the central axis of the drum. Liquids such as acid and oil are sprayed onto the food in the drum from a spray bar or spray manifold. The pins continuously lift and separate the strands of food while it moves through the drum, and mix the liquid and product, resulting in a uniform coating. This process and apparatus produce a uniformly coated flexible strandular food such as spaghetti with minimal temperature loss. The food is free flowing and not tangled at the discharge of the drum. Surges from upstream equipment are suppressed, producing a uniform flow to downstream equipment.

21 Claims, 3 Drawing Sheets

PROCESS OF COATING STRANDULA FOOD

This application is a continuation-in-part of copending application Ser. No. 07/991,454 which was filed on Dec. 15, 1992, now abandoned, which is a divisional of Ser. No. 07/745,055 which was filed on Aug. 6, 1991, now abandoned and which are incorporated herein in their entirety by reference.

BACKGROUND OF THE INVENTION

1. Field of Invention

This invention relates to a coating drum and associated method for coating of flexible strandular foods susceptible to microbial spoilage such as that of strandular cooked pasta or fabricated protein products, e.g., spaghetti, macaroni, noodles, etc. and particularly for such pasta products which are cooked and then coated with an acid and oil before packaging in an airtight container as part of a ready to eat meal having extended shelf life.

2. Prior Art

The above mentioned parent case of this application, namely, Ser. No. 07/991/454 relates to a packaged fully cooked meal having an extended shelf life. Such meal comprises a fully cooked starchy foodstuff and an edible acid that is uniformly dispersed in said foodstuff.

in the coating of cooked strandular pasta in the above described invention with the use of continuous apparatus, it was found that the strands would ball up in the coater, the coating was not uniform, and surges in the coater from the blancher would affect the acidity as well as the uniformity of the quality of product to be packaged. Additionally, it was difficult to maintain a sufficiently high temperature through the coater and downstream apparatus such as that for transferring product to the packaging equipment.

The inability to maintain the high temperature from the blancher to the packaging equipment or to isolate the pasta from contact with the atmosphere required that the pasta be subjected to pasteurization, sterilization or freezing for storage stability after being packaged in an airtight container.

Coating on a batch basis has shortcomings in addition to the amount of time and labor involved. Thus, cooked pasta becomes gummy if held more than about two minutes after draining. Also, the temperature drop during batch coating is excessive.

Continuous coating drums generally contain flights or baffles to tumble or turn the product. This, however, causes balling up of the cooked strandular pasta and affects the uniformity of acid as well as other treatments to which the pasta may be exposed in the coater. Furthermore, continuous coaters as well as down stream equipment for packaging of products are generally not insulated.

In the continuous coating of pasta strands, a significant decrease in temperature permits the growth of microorganisms. Additionally, lack of structure in the coater to limit surges in the feed from a continuous blancher adversely affects the uniformity of the coating and causes difficulties with downstream equipment such as packaging equipment. Surges of food to the coater are particularly prevalent with automatic blanchers since they have a screw drive for moving product through and out of the blancher.

SUMMARY OF THE INVENTION

It is an object of this invention to provide a coating drum for flexible strandular food which gently smoothes out surges from upstream equipment so that strands of such food are not broken.

it is another object of this invention to provide a coating drum having thermal insulation, a plurality of pick up elements for separating and tumbling strands of cooked pasta as they are being coated as well as means for uniformly moving such products from the entrance through the discharge end of the drum.

It is still another object of this invention to provide a coating drum as described above together with associated equipment for packaging cooked strands of pasta products while maintaining a high temperature and absence of microbial contamination so as to eliminate the need for further treatment for extended shelf life such as sterilization, pasteurization or freezing of the packaged products.

It is a further object of this invention to provide a method associated with the above coater and associated equipment for the continuous coating and packaging of strands of cooked pasta as well as other flexible strandular food subject to microbial spoilage.

DESCRIPTION OF THE PREFERRED EMBODIMENTS

Figure 2:
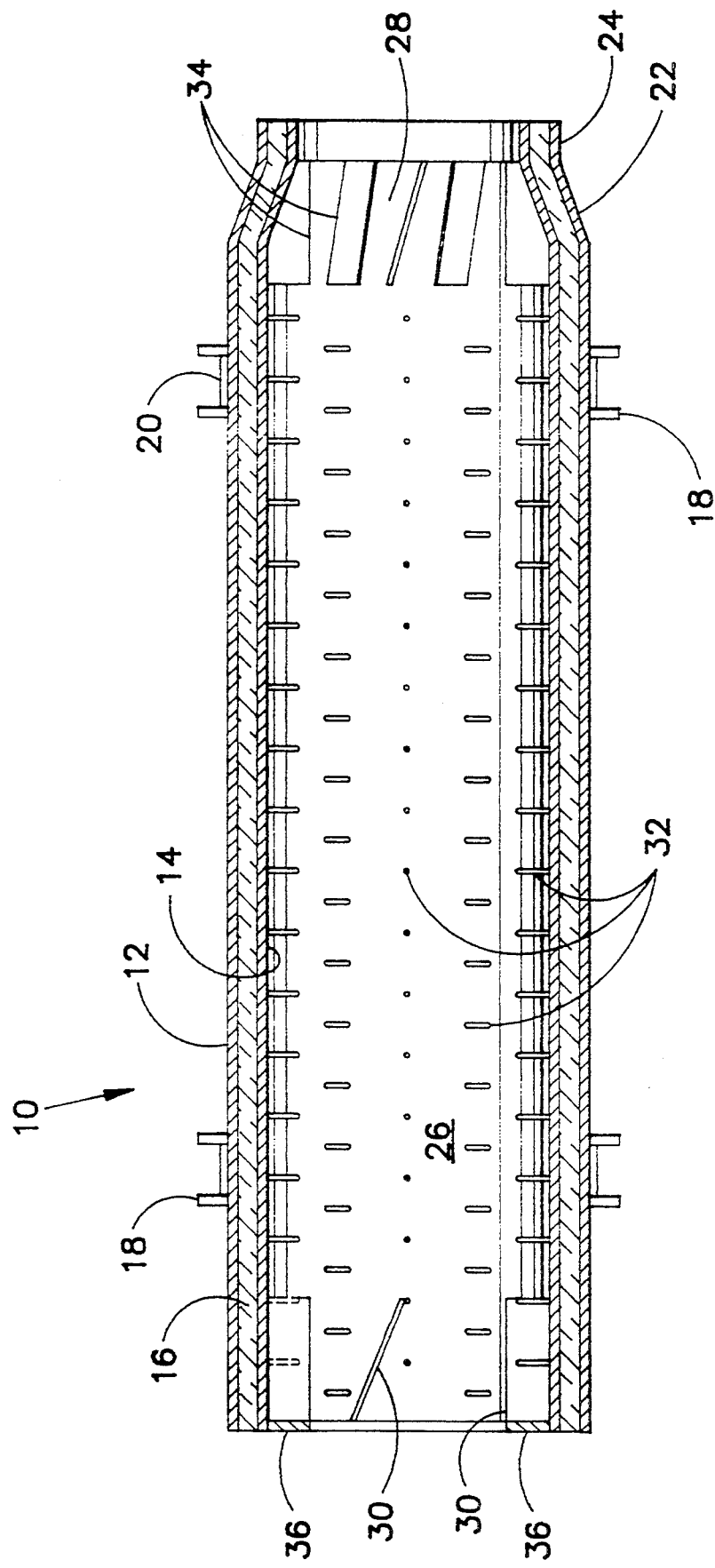
FIG. 2 is a simplified longitudinal cross-sectional illustration of the coating drum of FIG. 1.

Referring now to the drawings wherein identical reference characters are used to designate like parts, as best seen in FIG. 2, rotary coating drum 10 is constructed of outer shell 12 and inner shell 14 with thermal insulation 16 therebetween. End seals, not shown, are interposed at the two ends of the drum between the shells. Drum 10 rotates about a generally horizontal longitudinal axis and is approximately 92 inches long. The drum has an outside diameter of twenty eight inches, except for the conical portion 22 which is about 6 inches long and provides a restricted discharge opening 28. The inside of the drum has a diameter of twenty four inches. The drum includes an annular flange 24 of approximately 2 inches long axially of the body of the drum and wherein the discharge opening 28 is 16 inches in diameter. The outer periphery of annular flange 24 provides a close sealing tolerance with connecting downstream equipment.

The drum has an annular flange or dam 36 at the drum entrance 26. Attached to dam 36 and inner shell 14 are vanes or lifters 30 at the entrance. Vanes or lifters 34 at the discharge end are also attached to the inner shell. The lifters 30 and 34 have a pitch of approximately 30 degrees toward the exit or discharge end 28.

The drum is tilted at a pitch of at least one degree, e.g., up to about 5 degrees, from the entrance to the discharge end with the entrance being the high end. Thus, in addition to the action of vanes at the entrance and discharge ends, product moves toward the discharge end upon rotation of the drum. The drum rotates in a clockwise direction when looking through the drum from the entrance to the discharge.

The annular dam 36 restricts the entrance diameter to 16 inches and it minimizes steam flashing and loss of heat from the drum. The vanes at the entrance are four inches high and about 10 inches long. The vanes at the discharge are about four inches high and 13 inches long.

Figure 1:
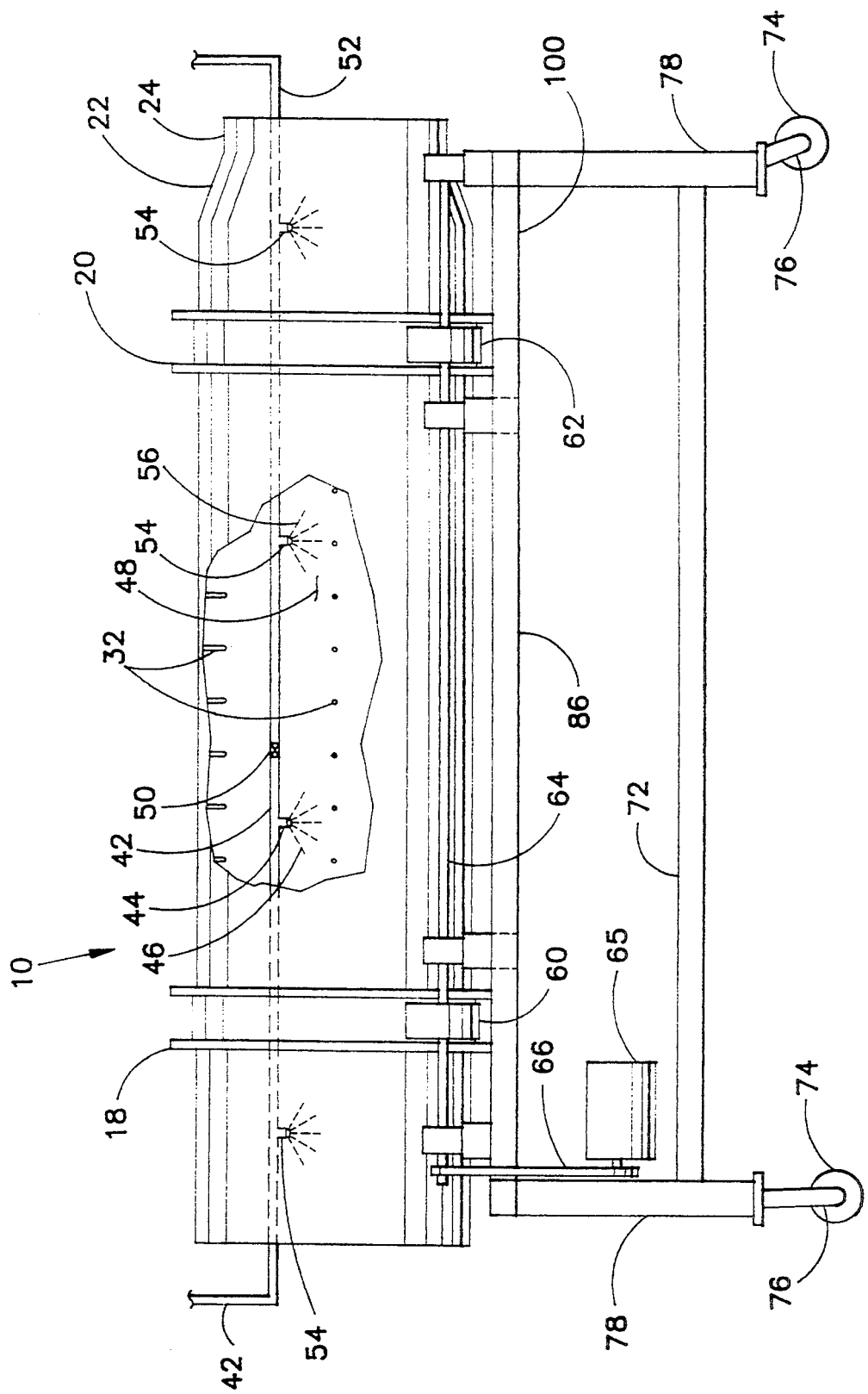
FIG. 1 is an elevational view of the coating drum of this invention together with some of its supporting structure and a cut away portion showing the interior of the drum.

Product pick up means such as pins 32 extend generally radially inward from the inner surface of the drum and, as best seen in FIG. 1 lift and tumble the cooked strandular pasta 48 in the drum while the pitch carries the product toward the discharge end 28. Both actions enable the transmission of coating material from one surface to another of the pasta 48 so that an even distribution of coating is achieved.

Pins 32 are 3 inches long and are constructed of ⅜ inch stainless steel rod. The interior of the drum has 8 longitudinal rows of the pins with 4 inch spacing longitudinally between pins with the alternate rows being off-center. Baffling (not shown) is placed at the entrance and discharge end of the drum for the retention of heat.

The interior of the drum from from one end to the other can contain the pins. Preferably the pins extend from the entrance, including the area having the entrance lifters, up to the discharge lifters. Apart from the area within the drum adjacent the entrance and the area within the drum adjacent the discharge, the drum is devoid of lifters. Thus, only about 5% to 20% of the drum length has entrance lifters and about 5% to 25% of the drum length has discharge lifters with the remaining or central section having pins but being devoid of lifters. The length of the drum having pins is at least twice that which has lifters and preferably three to four times that which has lifters.

For rotation of the drum, trunyon rings 20 are provided about the circumference of the drum and have metal flanges 18—18. The drum rotates at a speed of about 7 to 21 revolutions per minute.

Figure 3:
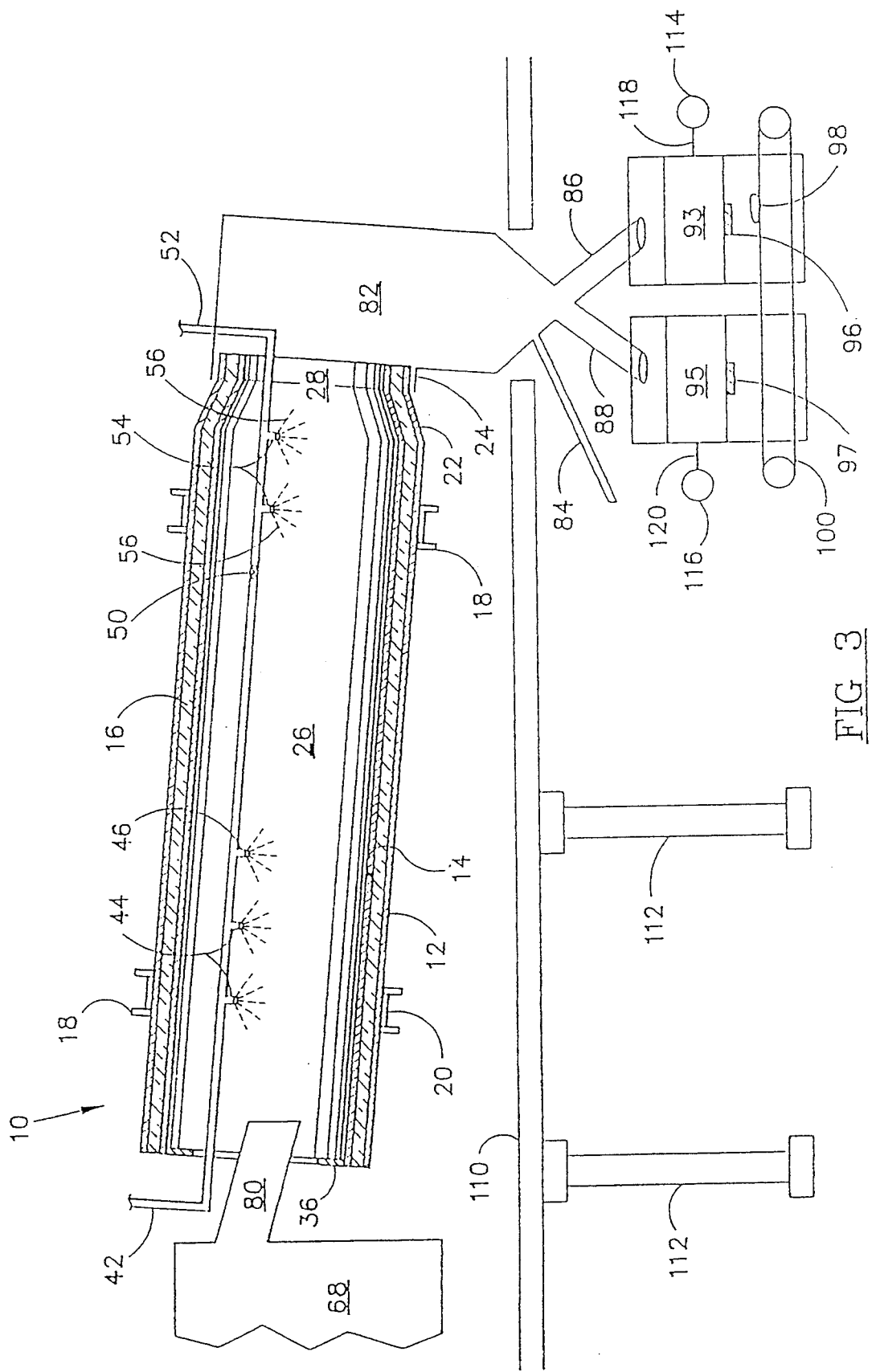
FIG. 3 is a simplified diagrammatic illustration of the coating drum of this invention together with associated equipment such as a continuous hot water blancher for the strandular pasta, a chute for feeding the cooked pasta to the coating drum, transfer chute for transfer of the cooked and coated pasta from the drum to metering pumps and packaging machines.

As best seen in FIG. 1 and FIG. 3, A stainless steel horizontal intake pipe 42 having spray nozzles 44 protrudes into the upper portion of drum entrance 26 and provides an acid spray 46 in the drum. Connecting support and stop 50 seals of and separates pipe 42 from pipe 52. Preferably, each of said pipes are separate and self supporting without support and stop 50. Pipe 52 carries a lecithin in oil mixture. Pipe 52 has spray nozzles 54 for production of the oil-lecithin spray 56. The length of the drum subject to the acid spray is longer, preferably about twice as long as the length of the drum subject to the oil spray.

As best seen in FIG. 1 trunyon wheels such as 60, 62 are fixed to a longitudinally extending shaft 64. The wheels support and rotate the drum. Shaft 64 is driven by one or more connecting chains 66 through motor 65.

The drum may be permanently installed in one position or, as shown in FIG. 1, may be movable, in which event drum 10 is mounted on a suitable platform 100 equipped with means for rollabley moving the assembly, such as wheels or casters 74 at the entrance end. The castors are mounted on shafts 76 which telescope within tubular vertical member supports 78 so as to adjust the pitch of the drum. The discharge opening of the drum is generally directed downwardly by extending the shafts 76 of the wheels or castors 74. The drum and blancher 68 are preferably located on a mezzanine floor 110 such as one supported by stanchions 112.

As best shown in FIG. 1 and FIG. 3 flexible strandular food 48, such as cooked spaghetti, is fed to the drum from intake chute 80, which in turn transfers the food from blancher 68. The coated product is discharged from the drum into discharge transfer chute 82. The intake of the discharge transfer chute snugly fits over the drum discharge annular flange 24. Chute 82 has a downwardly disposed body and a drain pipe 84 is provided to remove excess water from the food. The lower end of the chute is preferably bifurcated so that the product can go down through the first leg of the discharge chute 86 or the second leg 88. The selection of the chute leg is controlled by an operator. Chute leg 86 leads into metering pump and filler 93 whereas chute leg 88 leads into metering pump and filler 95. Filler 93 is fed plastic packaging material 118 from plastic roll 114 whereas filler 95 is fed plastic material 120 from plastic roll 116. Seals or baffles (not shown) are provided at the connections of the chute legs with the metering pumps and filler machines in order to conserve heat. The filler machines are form fill machines which package the products in plastic in a sealed manner. A doorway 96 permits packaged product 98 to be deposited on transfer belt 100 for any further processing.

The package used is that of a sealed container which prevents contact of the food with the atmosphere. The sealed container is comprised of a material having good barrier properties. Such materials include metals, glass, various synthetic resins, e.g., nylon or low density polyethylene.

By the term "flexible strandular food" we mean flexible food such as cooked spaghetti, macaroni, strands, fibers, filamentary, ribbon or tape shaped food such as that which has a length much greater than its width, e.g. the strand can vary from about 0.01 to 1 inches thick, e.g. diameter or width, to that of about 140 inches long and preferably that of about 0.05 inches thick to about 120 inches long. Illustrative of such food there can be mentioned various strandular alimentary cooked pasta and filamentary fabricated protein. Illustrative of the strandular cooked pasta foods there can be mentioned, spaghetti, macaroni, and noodles.

Of the alimentary pastes, virtually any paste obtained from a glutinous flour is suitable for use in the this invention. Examples of suitable glutinous flours include semolina flour, durum wheat flour, corn flour, buckwheat flour, farina flour and whole wheat flour. When fully cooked, alimentary pastes generally have a moisture content of about 65% to 85% by weight.

The method of this invention involves the continuous manufacture of product. Thus, the blancher cooks the strandular pasta and the cooked pasta is continuously transferred by screw drive to a chute which in turn places the pasta at the entrance of the coating drum. The entrance lifters urge product into the drum toward the discharge end and lifters at the discharge end push product out of the drum. The strands of pasta are separated and tumbled by the pins while being coated with an edible acid. The acid is absorbed by the pasta. The first spray to be applied is acid. The acid spray covers about two thirds of the length of the drum. The pasta is also subjected to an oil spray and such spray covers about one third of the drum's length adjacent its discharge end. A reversal of the sequence for applying the acid and oil spray produces erratic pH and an unsightly emulsion on the pasta. The pH of the pasta will vary from about 3.5 to 4.6 and preferably 4.0 to 4.6 in order to maintain a product of low microbiological content. The pasta discharged from the drum is then led to a proportioning or metering machine which can be a part of the packaging machine. The packaging machine places the pasta in an air tight package, preferably a sealed plastic pouch.

The pasta is continuously blanched and coated on an elevated platform such as a mezzanine and the coated pasta is gravity fed to a portioning and packaging machine. The proportioning machine or pump provides the packaging machine with predetermined quantity of pasta for packaging.

Illustrative of edible acids which can be used in this invention there can be mentioned: lactic acid; acetic acid; fumaric acid; citric acid; tartaric acid; sorbic acid: benzoic acid; and mixtures thereof. The quantity of edible acid added to the pasta is preferably sufficient to provide a pH within the range of about 3.5 to 4.6. The edible acid retards the growth of molds, bacteria and yeasts which cause spoilage. The acid is generally diluted with water to aid distribution. It is preferable that the acid penetrate into the surface of the pasta.

Maintaining the fully cooked, strandular pasta at a temperature above about 165° F. (74° C.), e.g., a temperature of at least 170° F. (77° C.), until packaged will provide a pasteurized food composition. In addition to maintaining the fully cooked, pasta under pasteurized conditions, until packaged the contents of the container may be further sterilized or pasteurized by any conventional means after sealing. For example, pasteurization can be achieved by heating the sealed and filled containers to a temperature above about 180° F. (82° C.) such as by treatment with steam or boiling water. For sterilization, the contents are heated to a temperature of about 212° F. (100° C.) and above.

The edible oil coating for use in this invention preferably has a melting point below about 95° F. (35° C.) to provide the desired function of preventing the fully cooked, strandular pasta from sticking and forming a solid mass. Preferably, below about 15% by weight edible oil is used based on the total weight of the package contents. Preferred quantities of edible oil generally range from about 1% to 8% by weight of the total package contents. Suitable edible oils include corn oil, unsaturated safflower oil, palm oil, olive oil, peanut oil coconut oil sunflower oil and the like.

The packaged pasta of the present invention has an extended shelf life. The term "extended shelf life", as used herein, indicates that the pasta is stabilized against spoilage by microbiological growth at room temperature for a period of not less than 1 week. Preferably, the foodstuffs are preserved against microbiological spoilage for a period of 6 months or more.

This invention has at least three primary unique features. The first is the use of insulation in the drum, along with an enclosed discharge chute to maintain product temperatures. The annular dam 36 at the drum entrance and baffling around the chute and any other conduits as well as baffling at the entrance assist in maintaining the product temperatures. The second is the use of pick up means such as pins to prevent product clumping and to improve pasta flow to down stream equipment. The third is the use of a tapered discharge to maintain product residence time and to smooth out the surges of pasta flow from the blancher.

The following examples and tests are provided to further illustrate the invention. In these examples and tests as well as throughout the specification and claims, all temperatures are expressed in degrees Fahrenheit and each value is accompanied by an approximation of such value in degrees Celsius. All pH values for the pasta are measured from samples containing 50 grams (g) of the pasta with 50 g of recently distilled water which have been minced in a Waring blender for about one minute. In addition, all parts and percentages are by weight, unless expressly indicated to be otherwise.

EXAMPLES AND TESTS

Test 1. Use of a conventional coating drum with flat bars was unsatisfactory for coating cooked spaghetti. The spaghetti tended to roll on the flat bars. This tangled the spaghetti resulting in non-uniform pH and large weight fluctuations in the down stream packaging equipment. This situation continued, more or less, when some of the bars were replaced with pins. Product flow and acidification were fully acceptable when all of the bars were replaced with pins whereas product flow and acidification were unacceptable before replacement of all the bars.

Test 2. Spaghetti was cooked on a batch basis. The first batch was blanched, drained and transferred to a ribbon blender. Pasta temperatures dropped during the transfer and the pasta became gummy. The ribbon blender chopped the spaghetti into short strands, producing an unacceptable product.

Test 3. Another test was conducted with spaghetti on a small batch kettle. At the end of the cooking cycle, the cook water was drained and the acid and oil were applied on the batch kettle. Coated spaghetti, at 185° F. (85° C.), was fed to a Hayssen vertical form fill and seal machine by a Raque piston filler. The piston filler chopped the product into short strands. Back pressure at the Hayssen machine macerated the spaghetti.

Test 4. Coated spaghetti was transferred from a coating drum to a packaging machine by a cleated belt conveyor. The belt was open to the atmosphere. Excessive temperature drop and open air exposure contributed to product contamination.

Test 5. Cooked pasta was conveyed across a vibrating conveyor to a coating drum. Acid was applied at the entrance of the coating drum, and oil at the discharge. The coating drum had no back mixing or product lifters to mix the spaghetti and coatings. The coating application was not even.

EXAMPLE OF THE INVENTION

Thin, ten inch long spaghetti having a diameter of 0.065 to 0.069 inches is continuously fed by a weight belt into the screw conveyor and blancher. Water temperature at the entrance in the blancher is set at 212° F. (100° C.) and the dwell time of the spaghetti in the blancher is 10 minutes. Fresh hot water at 210° F. (99° C.) is fed into the exit end of the blancher. Cooked spaghetti is discharged from the blancher and enters the coating drum. The acid solution is an 8% by weight solution of lactic acid in water. About 366 pounds of the acid solution is used for about 9,900 pounds of the cooked spaghetti. A mixture of corn oil and Lecithin is prepared by heating 422 pounds of corn oil to 200° F. (93° C.) and then slowly adding 1 pound 3 ounces of lecithin with constant agitation to the oil. About 423 pounds of the oil and lecithin mix is enough to spray on 15,000 pounds of the cooked spaghetti.

Acid solution is sprayed on the spaghetti at the front end of coating drum at rate sufficient to maintain the pH in the range of about 3.5 to 4.6. Oil and lecithin is sprayed onto the acid coated spaghetti near the discharge end of the coating drum at a rate sufficient to prevent sticking and provide lubrication to the strands of spaghetti. The coating drum is set at a speed of about 10 rpm. This speed is adjusted according to the pH in the finished pouched product. Optimum residence time in the coating drum is 1.5 minutes. The acid and oil coated spaghetti is discharged from the coating drum and fed through a covered chute into a proportioning pump and packaging machine and then pouched. A minimum center temperature for the spaghetti in the pouch of about 175° F. (79° C.) is maintained during packaging.

Optionally, the packaged product is then sent through a heat holding tunnel to maintain the minimum center temperature 175° F. (79° C.) for four (4) minutes. The product can then be sent to a spiral chiller to cool the product to 45° F.

The product of this example is a fully cooked pasta product, made from 10 inch spaghetti 0.065 inches to 0.069 inches in diameter, acidified with food grade lactic acid to pH 4.0 to 4.6, coated with corn oil and lecithin, and hot packed at 175° F. (79° C.) or above in a flexible pouch. This finished product will contain 2% to 5% of fat, at least 60% of the spaghetti will be 9 inches or over, the diameter of the spaghetti per 10 strands is 7/8 to 1⅛ inches. The moisture content is 67% or less as determined by vacuum oven method at 100° C. (212° C.) for five hours.

CONCLUSION

While the invention has been disclosed by reference to the details of a preferred embodiment, this disclosure is intended to be in an illustrative rather than in a limiting sense, as it is contemplated that modifications will readily occur to those skilled in the art, within the spirit of the invention and the scope of the appended claims. This invention includes many embodiments which have not been described in the detail provided by the above example. The absence of such detail for all embodiments does not exclude them form the embodiments claimed herein. The example described above can be repeated with other flexible strandular food subject to microbial spoilage, other edible acids, and other edible oils or lubricants with similar results.

What is claimed is:

1. A method for coating flexible strandular food susceptible to microbial spoilage, which comprises:
   A. placing said food in the entrance of an elongated, insulated, rotating drum open at its entrance and discharge ends and wherein the diameter of the discharge end is restricted;
   B. urging the food further into the drum by lifters within the entrance;
   C. lifting and separating the food with radially disposed pins within the drum periphery;
   D. contacting the food with an edible acid while the food moves through the drum toward the discharge end and the pins continue to separate and mix the acid and food resulting in a uniform coating of said acid on said food; and
   E. engaging the food with discharge lifters attached to the drum for discharge from the drum; and
   F. maintaining the food in the drum at a temperature of at least 165° F.

2. The method of claim 1 wherein the food is cooked pasta, the and is sprayed, and the drum is tilted with the entrance being the higher end.

3. The method of claim 2 wherein a first and a second coating is applied in the drum, the first coating being an aqueous solution of an edible acid and the second coating being an oil.

4. The method of claim 3 wherein the food is maintained at a temperature of at least 170° F.

5. The method of claim 4 wherein the acid imparts a pH of about 3.5 to 4.6 to the food.

6. The method of claim 5 wherein food discharged from the drum is packaged in airtight containers and the food is maintained at a temperature of at least 170° F. from the time it enters the drum until it is placed in the containers.

7. The method of claim 6 wherein the entrance diameter is reduced with an annular dam and the accumulation of pasta in the drum between the dam and the restricted discharge smoothes out surges in feed to the drum.

8. The method of claim 7 wherein the pH is maintained between about 4.0 to 4.6 and the temperature is maintained between 170° F. and 212° F.

9. A method for treating strands of flexible food susceptible to microbial spoilage which comprises:
   A. placing the food in an elongated thermally insulated drum rotatable about its longitudinal axis with the drum being tilted from the horizontal and having its entrance as the high end and wherein the discharge has a restricted opening;
   B. maintaining the strands in the drum at a temperature of at least 165° F.;
   C. pushing the strands with lifters within the drum entrance further into the drum;
   D. engaging the strands with a plurality of pick up elements which extend radially inwardly from the inner surface of the drum;
   E. picking up and separating the strands with the pick up elements during rotation of the drum while the strands are moved toward the discharge end;
   F. applying an edible acid coating on the strands while they are being lifted and separated so as to impart a pH of about 3.5 to 4.6 to the food; and
   G. pushing the strands out of the discharge end with lifters positioned within the discharge end.

10. The method of claim 9 wherein a coating of edible oil is applied to the food in sufficient quantity to inhibit sticking of the strands.

11. The method of claim 9 wherein the coating is both that of an edible acid and an edible oil.

12. The method of claim 11 wherein the acid imparts a pH of about 4.0 to 4.6 to the food.

13. The method of claim 11 wherein the food is first coated with acid and subsequently coated with an oil.

14. The method of claim 9 wherein the food is maintained at a temperature of at least 175° F.

15. The method of claim 13 wherein the food is of cooked pasta having a length of about 5 to 12 inches and the temperature is at least 170° F.

16. The method of claim 13 wherein the acid and oil are applied by spraying.

17. The method of claim 16 wherein the coated strands are packaged in airtight containers and are maintained at a temperature of at least 170° F. from the time they enter the drum until packaged.

18. A method for inhibiting microbial attack of a cooked strandular pasta product which comprises:

A. cooking pasta in a blancher having screw means for discharge of the cooked pasta;

B. placing the cooked pasta in the entrance of an elongated thermally insulated drum having a restricted entrance opening at one end and a tapered restricted discharge at the other end, said drum rotatable about its longitudinal axis and tilted from the horizontal with the entrance at the high end;

C. pushing the pasta with lifters within the drum entrance further into the drum;

D. engaging the pasta with a plurality of pick up elements which extend radially inwardly from the inner surface of the drum;

E. picking up and separating the strands with the pick up elements during rotation of the drum while the strands are being moved toward the discharge end;

F. spraying the pasta while it is being lifted and separated with an edible acid and imparting pH of about 3.5 to 4.6 to the pasta and subsequently spraying the pasta with an edible oil while it is being lifted and separated in the drum;

G. pushing the sprayed pasta out of the discharge end with lifters;

H. transferring the pasta to packaging equipment where the pasta is packaged in airtight containers; and I. wherein the temperature of the cooked pasta from the blancher until packaged is maintained at no less than 165° F.

19. The method of claim 18 wherein the edible oil has a melting point below 95° F.

20. The method of claim 19 wherein the pick up elements are pins and the pH of the pasta at the discharge end is from about 4.0 to 4.6.

21. A method for continuously preparing a preserved food of strandular cooked pasta which comprises continuously:

A. cooking the pasta in a blancher having a screw conveyor for moving the pasta therethrough;

B. discharging the cooked pasta in the entrance of a rotating elongated and thermally insulated drum having an entrance opening at one end and a discharge opening at the other wherein the longitudinal axis of the drum is tilted from about 1 degree to about 5 degrees from the horizontal with the entrance being on the high end and wherein the pasta is discharged in the drum inwardly of an annular dam providing a restricted entrance opening which assists in maintaining heat in the drum;

C. urging the pasta toward the discharge end with lifters attached to the drum within the dam wherein said lifters occupy no more than about 20% of the drum length;

D. engaging the pasta with radially disposed pins within the drum periphery while lifting and tumbling the pasta with the pins while the pasta is moving toward the discharge end;

E. spraying the pasta with an edible acid while it is being lifted and tumbled so as to coat the pasta with acid;

F. spraying the pasta with an edible oil wherein the acid spray contacts the pasta for a longer time than the oil spray;

G. moving the pasta toward the discharge end wherein the drum is conical and has a restricted discharge opening to permit accumulation of pasta in the drum and dampen surges from the blancher;

H. engaging the pasta with lifters positioned within the drum adjacent the discharge opening for pushing the pasta out of the drum and wherein the lifters occupy no more than about 20% of the drum length;

I. imparting a pH of 3.5 to 4.6 to the pasta discharged from the drum due to the acidity of the spray and wherein the quantity of oil sprayed on the pasta is sufficient to inhibit sticking of the pasta discharged from the drum; and J. packaging the pasta in airtight containers and wherein the temperature of the pasta is maintained at no less than 170° F. from the time it is cooked until it is packaged.

* * * * *